United States Patent
Hoshina et al.

(10) Patent No.: US 10,305,106 B2
(45) Date of Patent: May 28, 2019

(54) NONAQUEOUS ELECTROLYTE BATTERY AND BATTERY PACK

(71) Applicant: Kabushiki Kaisha Toshiba, Minato-ku (JP)

(72) Inventors: Keigo Hoshina, Yokohama (JP); Tetsuya Sasakawa, Yokohama (JP); Mitsuru Ishibashi, Yokohama (JP); Yoshiyuki Isozaki, Tokyo (JP); Norio Takami, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 285 days.

(21) Appl. No.: 15/066,145

(22) Filed: Mar. 10, 2016

(65) Prior Publication Data
US 2016/0190587 A1 Jun. 30, 2016

Related U.S. Application Data

(63) Continuation of application No. PCT/JP2013/075742, filed on Sep. 24, 2013.

(51) Int. Cl.
*H01M 4/58* (2010.01)
*H01M 4/60* (2006.01)
(Continued)

(52) U.S. Cl.
CPC ......... *H01M 4/5825* (2013.01); *H01M 4/136* (2013.01); *H01M 4/364* (2013.01);
(Continued)

(58) Field of Classification Search
CPC ...... H01M 4/582; H01M 4/505; H01M 4/485; H01M 4/364; H01M 4/136; H01M 10/0525
See application file for complete search history.

(56) References Cited

U.S. PATENT DOCUMENTS 7,972,730 B2 7/2011 Inagaki et al.
2006/0257737 A1 11/2006 Goh et al.
(Continued)

FOREIGN PATENT DOCUMENTS

JP 2007-095496 A 4/2007
JP 2007-123251 A 5/2007
(Continued)

OTHER PUBLICATIONS

Japanese Office Action dated Nov. 1, 2016 in Patent Application No. 2015-538662 (without English Translation).
(Continued)

*Primary Examiner* — Kenneth J Douyette
(74) *Attorney, Agent, or Firm* — Oblon, McClelland, Maier & Neustadt, L.L.P.

(57) ABSTRACT

According to one embodiment, a nonaqueous electrolyte battery is provided. This nonaqueous electrolyte battery includes a negative electrode, a positive electrode, and a nonaqueous electrolyte. The negative electrode contains a negative electrode active material having a Li insertion/extraction potential of 0.8 V (vs. Li/Li$^+$) or more. The positive electrode contains a positive electrode active material represented by LiMn$_{1-x-y}$Fe$_x$A$_y$PO$_4$ (where 0<x≤0.3, 0≤y≤0.1, and A is at least one selected from the group consisting of Mg, Ca, Al, Ti, Zn, and Zr) and an active material that Li can be inserted to at a potential of 3.3 V (vs. Li/Li$^+$) or less.

20 Claims, 5 Drawing Sheets

(51) Int. Cl.
*H01M 4/485* (2010.01)
*H01M 4/136* (2010.01)
*H01M 10/0525* (2010.01)
*H01M 4/36* (2006.01)
*H01M 4/505* (2010.01)

(52) U.S. Cl.
CPC ........... *H01M 4/505* (2013.01); *H01M 4/582* (2013.01); *H01M 4/602* (2013.01); *H01M 10/0525* (2013.01); *H01M 4/485* (2013.01); *H01M 4/5815* (2013.01); *Y02T 10/7011* (2013.01)

(56) References Cited

U.S. PATENT DOCUMENTS

| | | |
|---|---|---|
| 2007/0072080 A1 | 3/2007 | Inagaki et al. |
| 2007/0072081 A1 | 3/2007 | Kitao et al. |
| 2007/0264567 A1 | 11/2007 | Yang et al. |
| 2009/0075165 A1 | 3/2009 | Park et al. |
| 2009/0087362 A1 | 4/2009 | Sun et al. |
| 2010/0248038 A1 | 9/2010 | Takami et al. |
| 2011/0017528 A1* | 1/2011 | Kumar .................. H01M 4/366 180/65.1 |
| 2013/0101878 A1* | 4/2013 | Pilgram .................. H01M 4/13 429/99 |
| 2013/0122348 A1* | 5/2013 | Ishibashi .................. H01M 2/02 429/156 |
| 2013/0220817 A1* | 8/2013 | Walker ................ H01M 4/0402 205/59 |

FOREIGN PATENT DOCUMENTS

| | | |
|---|---|---|
| JP | 2007-305585 A | 11/2007 |
| JP | 2008-34306 | 2/2008 |
| JP | 2008-536285 A | 9/2008 |
| JP | 2008-547156 A | 12/2008 |
| JP | 2009-76446 A | 4/2009 |
| JP | 2010-225486 | 10/2010 |
| JP | 2012-33507 | 2/2012 |
| JP | 2013-110134 | 6/2013 |
| JP | 2014-29872 A | 2/2014 |

OTHER PUBLICATIONS

International Search Report dated Oct. 29, 2013, in PCT/JP2013/075742, filed Sep. 24, 2013 (with English Translation).
Written Opinion dated Oct. 29, 2013, in PCT/JP2013/075742, filed Sep. 24, 2013.
Seung-Min Oh, et al., "High-Performance Carbon-LiMnPO$_4$ Nanocomposite Cathode for Lithium Batteries," *Advanced Functional Materials*, 20, 3260-3265 (2010).

* cited by examiner

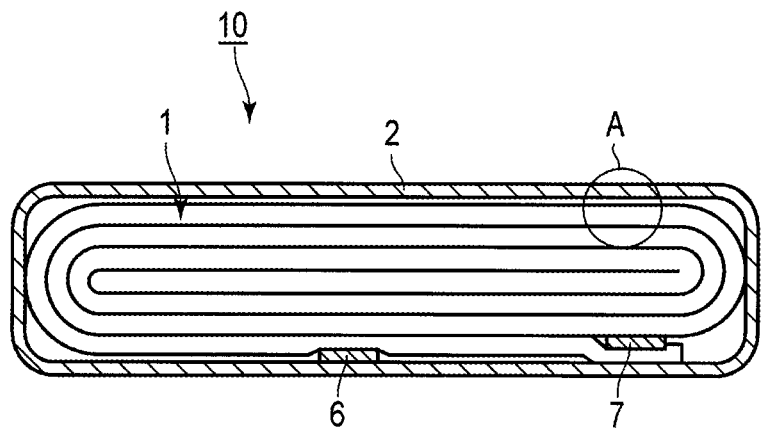
F I G. 1
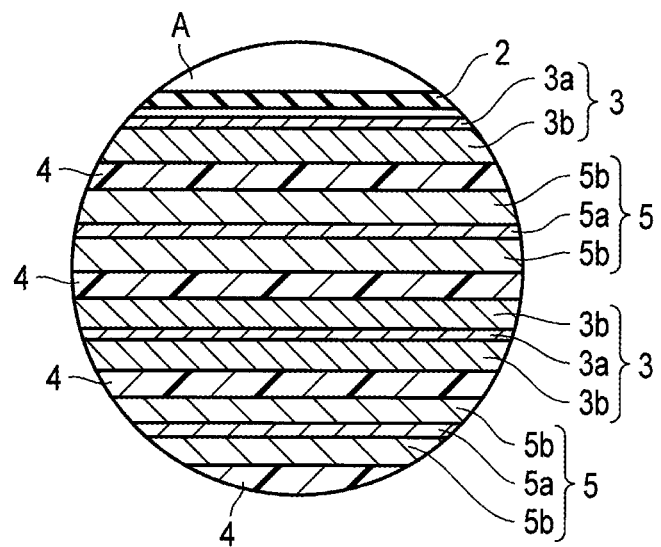
F I G. 2

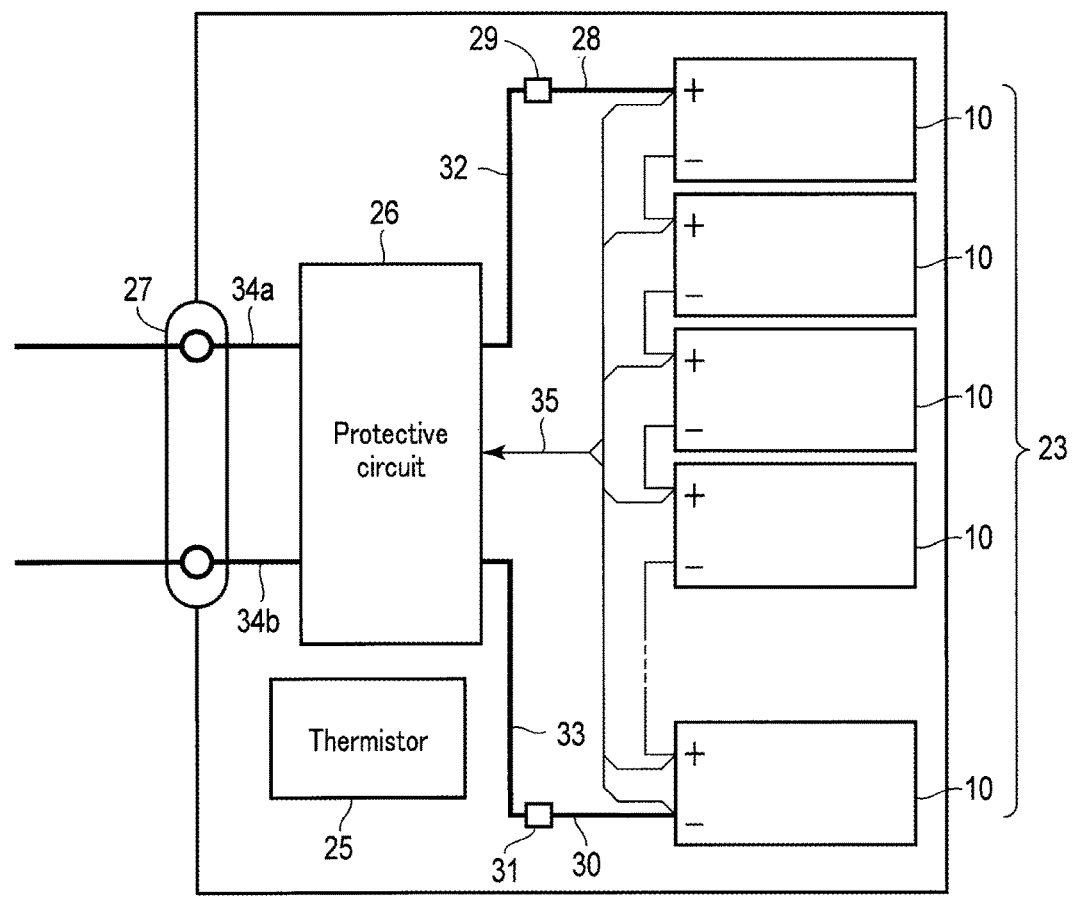
F I G. 6

NONAQUEOUS ELECTROLYTE BATTERY AND BATTERY PACK

CROSS-REFERENCE TO RELATED APPLICATIONS

This application is a Continuation Application of PCT Application No. PCT/JP2013/075742, filed Sep. 24, 2013, the entire contents of which are incorporated herein by reference.

FIELD

Embodiments of the present invention relate to a nonaqueous electrolyte battery and a battery pack.

BACKGROUND

A nonaqueous electrolyte battery which is charged and discharged by movement of lithium ions between negative and positive electrodes has been actively studied as a high energy density battery.

The nonaqueous electrolyte battery is expected to be utilized also as medium or large size power sources as well as power sources for miniature electronic devices. Cycle life characteristics and high stability are required in such medium or large size applications.

As a positive electrode active material of a nonaqueous electrolyte battery, a lithium transition metal composite oxide is used, for example. As a transition metal, Co, Mn, Ni, or the like is used. As inexpensive and highly stable positive electrode materials, spinel type lithium manganate, olivine type compounds such as olivine type lithium iron phosphate, and olivine type lithium manganese phosphate have been actively studied in recent years.

Among these, since the olivine type compounds have a low electron conductivity, it has been difficult to obtain good rate performance. In particular, it has been difficult to obtain a lithium manganese phosphate having good charge/discharge properties. Heretofore, carbon coating for enhancing electron conductivity has been known. Further, it has been known that electron conductivity is enhanced by increasing the amount of carbon coating applied to an olivine type compound to enhance the charge/discharge properties. Furthermore, it has been found that deterioration of lithium manganese phosphate progresses due to reduction in the potential at the end of discharge.

BRIEF DESCRIPTION OF THE DRAWINGS

FIG. 1 is a cross-sectional schematic diagram of a flat-type nonaqueous electrolyte battery of an example according to a first embodiment.

FIG. 2 is an enlarged cross-sectional view of an A portion of FIG. 1.

FIG. 6 is a block diagram showing an electrical circuit of the battery pack shown in FIG. 5.

DETAILED DESCRIPTION

Figure 3:
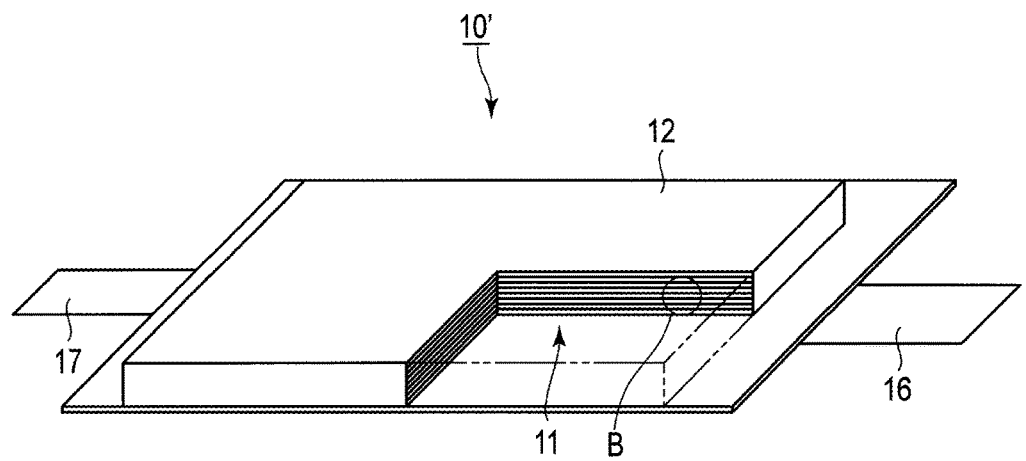
FIG. 3 is a partially notched perspective view schematically showing a flat-type nonaqueous electrolyte battery of another example according to the first embodiment.

According to the first embodiment, a nonaqueous electrolyte battery is provided. This nonaqueous electrolyte battery includes a negative electrode, a positive electrode, and a nonaqueous electrolyte. The negative electrode contains a negative electrode active material having a Li insertion/extraction potential of 0.8 V (vs. Li/Li$^+$) or more. The positive electrode contains a positive electrode active material represented by LiMn$_{1-x-y}$Fe$_x$A$_y$PO$_4$ (where 0<x≤0.3, 0≤y≤0.1, and A is at least one selected from the group consisting of Mg, Ca, Al, Ti, Zn, and Zr) and an active material that Li can be inserted to at a potential of 3.3 V (vs. Li/Li$^+$) or less.

According to a second embodiment, a battery pack is provided. The battery pack includes the nonaqueous electrolyte battery according to the first embodiment.

Embodiments of the present invention will be described below with reference to the accompanying drawings. The same reference symbols denote components having the same or similar functions throughout all of the drawings and their duplicated descriptions will be omitted. Each drawing is a schematic diagram for explaining the embodiments and for facilitating an understanding of the embodiments and may represent different shapes, dimensional ratios, and the like from those of the actual device. Hence, these structural designs may be properly changed taking the following explanations and known technologies into consideration.

First Embodiment

According to the first embodiment, a nonaqueous electrolyte battery is provided. This nonaqueous electrolyte battery includes a negative electrode, a positive electrode, and a nonaqueous electrolyte. The negative electrode contains a negative electrode active material having a Li insertion/extraction potential of 0.8 V (vs. Li/Li$^+$) or more. The positive electrode contains a positive electrode active material represented by LiMn$_{1-x-y}$Fe$_x$A$_y$PO$_4$ (where 0<x≤0.3, 0≤y≤0.1, and A is at least one selected from the group consisting of Mg, Ca, Al, Ti, Zn, and Zr) and an active material that Li or Li ion can be inserted to at a potential of 3.3 V (vs. Li/Li$^+$) or less. One sort of A may be used alone or two sorts or more may be used in combination.

In the nonaqueous electrolyte battery, when the negative electrode active material having a Li insertion/extraction potential of 0.8 V (vs. Li/Li$^+$) or more is used, reductive decomposition of an electrolytic solution is less likely to occur, so that charge/discharge efficiency of the negative electrode is enhanced. Thus, when the negative electrode active material having a Li insertion/extraction potential of 0.8 V (vs. Li/Li$^+$) or more is used, a discharge potential of the positive electrode may be reduced. Thus, when the negative electrode containing such a negative electrode active material and the positive electrode containing lithium manganese phosphate are used together in the nonaqueous electrolyte battery, there has been a problem that the potential of the positive electrode is rapidly reduced at the end of discharge.

As a result of intensive studies in view of the above circumstances, the present inventors found that when in the positive electrode, iron-containing lithium manganese phosphate and a material that Li or Li ion can be inserted to at a potential of 3.3 V (vs. Li/Li$^+$) or less are used together, a rapid reduction in the potential of the positive electrode at the end of discharge can be prevented while utilizing a high charge/discharge efficiency of the negative electrode, and, at the same time, output characteristics at a low state of charge-can be enhanced.

Since the nonaqueous electrolyte battery according to the first embodiment can prevent the potential of the positive electrode from being rapidly reduced at the end of discharge, deterioration of the positive electrode can be prevented when charge/discharge are repeated. Further, since the nonaqueous electrolyte battery according to the embodiment is excellent in the output characteristics at a low state of charge, even if discharge is performed at a large current at a low state of charge, the reduction in the potential of the positive electrode can be eased, and, in turn, deterioration of the positive electrode can be prevented. These aspects allow the nonaqueous electrolyte battery according to the first embodiment to exhibit excellent cycle life characteristics.

When a compound represented by the above chemical formula $LiMn_{1-x-y}Fe_xA_yPO_4$ is used as a positive electrode active material, an energy density of the positive electrode can be enhanced.

Thus, according to the first embodiment, a nonaqueous electrolyte battery which can exhibit high energy density and excellent cycle life characteristics can be provided.

As a negative electrode active material, the aforementioned negative electrode active material having a Li insertion/extraction potential of 0.8 V (vs. Li/Li$^+$) or more is at least used. When the negative electrode active material having a Li insertion/extraction potential of 0.8 V (vs. Li/Li$^+$) or more is used, although the positive electrode potential is less likely to be reduced, reductive decomposition of a nonaqueous electrolyte is likely to occur at a potential of 0.8 V (vs. Li/Li$^+$) or less, and the charge/discharge efficiency of the negative electrode is reduced.

In terms of the energy density, a negative electrode active material having a Li insertion/extraction potential of 2.0 V (vs. Li/Li$^+$) or less is preferably used.

Among the negative electrode active materials having a Li insertion/extraction potential of 0.8 V (vs. Li/Li$^+$) or more, a titanium composite oxide is preferably used. Examples of the titanium composite oxide include titanium-containing oxides such as lithium titanate having a spinel structure, monoclinic β-type titanium composite oxide, anatase-type titanium composite oxide, ramsdelite-type lithium titanate, $TiNb_2O_7$, and $Ti_2Nb_2O_9$. Among them, lithium titanate having a spinel structure is preferable because it is excellent in cycle and rate performance. Other examples of the negative electrode active material having a Li insertion/extraction potential of 0.8 V (vs. Li/Li$^+$) or more include niobium composite oxides such as $Nb_2O_5$ and $Nb_{12}O_{29}$.

The negative electrode active material may contain one or more kinds of negative electrode active material having a Li insertion/extraction potential of 0.8 V (vs. Li/Li$^+$) or more.

As the positive electrode active material represented by $LiMn_{1-x-y}Fe_xA_yPO_4$, a positive electrode active material containing, for example, Mg as a metal element A is preferable. The positive electrode may contain a plural of kinds of the positive electrode active materials represented by $LiMn_{1-x-y}Fe_xA_yPO_4$.

The positive electrode may contain one or more kinds of positive electrode active materials different from the positive electrode active materials represented by $LiMn_{1-x-y}Fe_xA_yPO_4$.

As the materials contained in the positive electrode which Li or Li ion can be inserted to at a potential of 3.3 V (vs. Li/Li$^+$) or less, various types of oxides, fluorides, sulfides, and polymer compounds may be used, for example. Materials not containing lithium when contained in the positive electrode are preferable. Further, materials that Li or Li ion can be inserted to at a potential of 2.8 V (vs. Li/Li$^+$) or more are more preferable.

Examples of the above oxides include vanadium oxides such as $V_6O_{13}$ and $V_2O_5$, manganese oxides such as $MnO_2$, and molybdenum oxides such as $MoO_3$. Other examples include composite oxides such as $Cu_2V_2O_7$, $Fe_2(MoO_4)_3$, and $Fe_2(WO_4)_3$. Preferred are manganese oxides. Examples of the fluorides include iron fluorides such as $FeF_3$. Examples of the sulfides include titanium sulfides such as $TiS_2$.

For the positive electrode, a ratio of the weight of the positive electrode active material to the weight of a material that Li or Li ion can be inserted to at a potential of 3.3 V (vs. Li/Li$^+$) or less is preferably from 10 to 100. If the ratio is in this range, the rapid reduction in the potential of the positive electrode at the end of discharge can be further prevented while preventing the reduction in the energy density. For the positive electrode, the ratio of the weight of the positive electrode active material to the weight of the material that Li can be inserted to at a potential of 3.3 V (vs. Li/Li$^+$) or less is more preferably from 10 to 40.

Whether the positive electrode contains the material that Li or Li ion can be inserted to at a potential of 3.3 V (vs. Li/Li$^+$) or less can be confirmed by decomposing the nonaqueous electrolyte battery to take out the positive electrode, and, thus, to perform single-electrode evaluation. The confirmation method will be hereinafter described.

First, the nonaqueous electrolyte battery in a discharged state is decomposed to take out the positive electrode. The taken-out electrode is cleaned using a chain carbonate such as ethyl methyl carbonate. A three-electrode cell using the taken-out positive electrode as the working electrode and using Li metal as the reference electrode and the counter electrode is produced. The three-electrode cell is charged to 4.25 V (vs. Li/Li$^+$) and then discharged to 2 V (vs. Li/Li$^+$), and the potential to Li metal of the working electrode during that period is checked. The charge/discharge rates are each a current value of 0.2 C or less. Thus, the discharge curve of the positive electrode can be obtained.

In the obtained discharge curve, a plateau derived from oxidation-reduction of manganese and iron of the positive electrode active material represented by $LiMn_{1-x-y}Fe_xA_yPO_4$ is observed near 4.1 V (vs. Li/Li$^+$) and 3.5 V (vs. Li/Li$^+$). When the positive electrode does not contain the material that Li or Li ion can be inserted to at a potential of 3.3 V (vs. Li/Li$^+$) or less, no inflection point of the discharge curve is observed at 3.3 V (vs. Li/Li$^+$) or less. Meanwhile, when the positive electrode contains the material that Li or Li ion can be inserted to at a potential of 3.3 V (vs. Li/Li$^+$) or less, the discharge curve has a plateau at 3.3 V (vs. Li/Li$^+$) or less, and an inflection point is observed. Specifically, see FIGS. 7 and 8.

In the material that Li or Li ion can be inserted to at a potential of 3.3 V (vs. Li/Li$^+$) or less, when the crystallinity of the material is high, the material can be identified by X-ray diffraction (XRD) measurement. The XRD measurement method is described as follows.

The nonaqueous electrolyte battery in a discharged state is disassembled in a glove box with an argon atmosphere to take out the electrode. The electrode is cleaned using a chain carbonate such as ethyl methyl carbonate. After the electrode is cleaned and dried, the electrode is taken out of the glove box to be applied onto a glass sample plate. At this time, it should be noted that the electrode is prevented from being peeled or floated using a double-sided tape or the like. If necessary, the electrode may be cut into an appropriate size for applying the electrode onto the glass sample plate. Further, an Si standard sample may be added onto the electrode to correct a peak position. Then, the glass plate onto which the electrode is applied is installed in a powder X-ray diffractometer, and a diffraction pattern is obtained using a Cu-Kα ray. The material that Li or Li ion can be inserted to at a potential of 3.3 V (vs. Li/Li$^+$) or less is identified from a peak other than a peak due to LiMn$_{1-x-y}$Fe$_x$A$_y$PO$_4$ (where 0<x≤0.3, 0≤y≤0.1, and A is at least one selected from the group consisting of Mg, Ca, Al, Ti, Zn, and Zr) from the obtained pattern.

Next, a nonaqueous electrolyte secondary battery according to the first embodiment will be described in more detail.

The nonaqueous electrolyte battery according to the first embodiment includes a negative electrode, a nonaqueous electrolyte, and a positive electrode. The nonaqueous electrolyte battery according to the first embodiment may further include a separator, a container, a positive electrode terminal, and a negative electrode terminal.

The negative electrode and the positive electrode can constitute an electrode group while interposing a separator between the negative electrode and the positive electrode. The nonaqueous electrolyte can be held by the electrode group. The container can accommodate the electrode group and the nonaqueous electrolyte. The positive electrode terminal can be electrically connected to the positive electrode. The negative electrode terminal can be electrically connected to the negative electrode.

Hereinafter, the negative electrode, the nonaqueous electrolyte, the positive electrode, the separator, the container, the positive electrode terminal, and the negative electrode terminal will be described in detail.

(Negative Electrode)

The negative electrode may include a negative electrode current collector and a negative electrode active material layer. The aforementioned negative electrode active material may be contained in the negative electrode active material layer. The negative electrode active material layer may further contain a conductive agent and a binder. The negative electrode active material layer may be formed on one or both surfaces of the negative electrode current collector.

The negative electrode current collector is preferably formed of an electrochemically stable material in a potential range higher than 0.8 V (vs. Li/Li$^+$), for example, an aluminum foil or an aluminum alloy foil containing elements such as Mg, Ti, Zn, Mn, Fe, Cu, and Si.

The conductive agent can improve the current collecting performance and reduce the contact resistance between the negative electrode active material and the current collector. Examples of the conductive agent include carbonaceous materials such as acetylene black, carbon black, graphite, carbon nanofiber, and carbon nanotube. Those carbonaceous materials may be used singly, or a plural of carbonaceous materials may be used.

The binder can bind the active material and the conductive agent with the current collector. Examples of the binder include a polytetrafluoroethylene (PTFE), polyvinylidene fluoride (PVdF), fluoro-rubber, acrylic resin, and celluloses such as carboxymethylcellulose.

As for the blending ratio of the negative electrode active material, the conductive agent, and the binder, it is preferable that the negative electrode active material is blended in an amount of 70% or more by mass to 96% or less by mass, the conductive agent is blended in an amount of 2% or more by mass to 28% or less by mass, and the binder is blended in an amount of 2% or more by mass to 28% or less by mass.

If the conductive agent is blended in an amount of less than 2% by mass, there is a fear that the current collecting performance of the negative electrode active material layer is lowered and the large-current performance of the non-aqueous electrolyte battery is deteriorated. If the binder is blended in an amount of less than 2% by mass, there is a fear that the binding ability of the negative electrode active material layer with the negative electrode current collector is deteriorated, leading to a deteriorated cycle performance. Meanwhile, in terms of higher capacity, the conductive agent and the binder are preferably blended in an amount of 28% or less by mass.

The negative electrode can be produced by the following method, for example. First, the negative electrode active material, the conductive agent, and the binder are suspended in a solvent to prepare a slurry. This slurry is coated onto one or both surfaces of the negative electrode current collector to be dried, and, thus, to form a negative electrode active material layer. After that, the negative electrode layer is pressed. Alternatively, the negative electrode active material, the conductive agent, and the binder are formed into a pellet, and the pellet may be used as the negative electrode active material layer.

(Positive Electrode)

The positive electrode may include a positive electrode current collector and a positive electrode active material layer. The aforementioned positive electrode active material and the material that Li or Li ion can be inserted to at a potential of 3.3 V (vs. Li/Li$^+$) or less may be contained in the positive electrode layer. The positive electrode active material layer may further contain a conductive agent and a binder. The positive electrode active material layer may be formed on one or both surfaces of the positive electrode current collector.

The positive electrode current collector is preferably an aluminum foil or an aluminum alloy foil containing one or more elements selected from Mg, Ti, Zn, Mn, Fe, Cu, and Si.

Examples of another positive electrode active material which may be contained in the positive electrode include various lithium-containing oxides.

Examples of lithium-containing oxides include lithium-manganese composite oxides (such as Li$_x$Mn$_2$O$_4$ or Li$_x$MnO$_2$), lithium-nickel composite oxides (such as Li$_x$NiO$_2$), lithium-cobalt composite oxides (such as Li$_x$CoO$_2$), lithium-nickel-cobalt composite oxides (such as LiNi$_{1-y}$Co$_y$O$_2$), lithium-manganese-cobalt composite oxides (such as Li$_x$Mn$_y$Co$_{1-y}$O$_2$), lithium-nickel-cobalt-manganese composite oxides (such as LiNi$_{1-y-z}$Co$_y$Mn$_z$O$_2$), lithium-nickel-cobalt-aluminum composite oxides (such as LiNi$_{1-y-z}$Co$_y$Al$_z$O$_2$), and lithium-manganese-nickel composite oxides having a spinel structure (such as Li$_x$Mn$_{2-y}$Ni$_y$O$_4$). Here, it is preferable that 0<x≤1, 0≤y≤1, and 0≤z≤1.

Among those, lithium-manganese composite oxide (Li$_x$Mn$_2$O$_4$), lithium-cobalt composite oxide (Li$_x$CoO$_2$), lithium-nickel-cobalt composite oxide (Li$_x$Ni$_{1-y}$Co$_y$O$_2$), lithium-manganese-cobalt composite oxide (Li$_x$Mn$_y$Co$_{1-y}$O$_2$), and lithium-nickel-cobalt-manganese composite oxide (such as LiNi$_{1-y-z}$Co$_y$Mn$_z$O$_2$) are preferable. Here, it is preferable that 0<x≤1, 0≤y≤1, and 0≤z≤1.

As the conductive agent and the binder that may be contained in the positive electrode, those which are similar to those used in the negative electrode may be used.

It is preferable that in the positive electrode layer, the total amount of the positive electrode active material represented by LiMn$_{1-x-y}$Fe$_x$A$_y$PO$_4$, the material that Li or Li ion can be inserted to at a potential of 3.3 V (vs. Li/Li$^+$) or less, and another arbitrary positive electrode active material, the conductive agent, and the binder are respectively blended in an amount of 80% or more by mass to 95% or less by mass, 3% or more by mass to 18% or less by mass, and 2% or more by mass to 17% or less by mass. The conductive agent can produce the aforementioned effect by blending it in an amount of 3% or more. The conductive agent can reduce decomposition of the nonaqueous electrolyte on a surface of the conductive agent by blending it in an amount of 18% or less when the nonaqueous electrolyte is stored at high temperatures. When the binder is formulated in an amount of 2% or more by mass, sufficient electrode strength can be obtained. When the binder is formulated in an amount of 17% or less, the amount of the binder as an insulating material in the positive electrode can be reduced, making possible to reduce internal resistance.

The positive electrode can be produced by the following method, for example. First, the positive electrode active material containing the positive electrode active material represented by $LiMn_{1-x-y}Fe_xA_yPO_4$, the material that Li or Li ion can be inserted to at a potential of 3.3 V (vs. $Li/Li^+$) or less, the conductive agent, and the binder are suspended in a solvent to prepare a slurry. This slurry is coated onto one or both surfaces of the current collector to be dried, and, thus, to form a positive electrode active material layer. After that, the positive electrode active material layer is pressed. Alternatively, the positive electrode active material, the material that Li or Li ion can be inserted to at a potential of 3.3 V (vs. $Li/Li^+$) or less, the conductive agent, and the binder are formed into a pellet, and the pellet may be used as the positive electrode active material layer.

(Nonaqueous Electrolyte)

As the nonaqueous electrolyte, a liquid nonaqueous electrolyte or a gel-like nonaqueous electrolyte may be used. The liquid nonaqueous electrolyte is prepared by dissolving an electrolyte into an organic solvent. The concentration of the electrolyte is preferably in a range of 0.5 mol/l to 2.5 mol/l. The gel-like nonaqueous electrolyte is prepared by compounding a liquid electrolyte and a polymer material.

Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethansulfonate ($LiCF_3SO_3$), and bistrifluoromethylsulfonylimide lithium [$LiN(CF_3SO_2)_2$]. Those electrolytes may be used either singly or in combinations of two or more. The electrolyte preferably contains $LiPF_6$.

Examples of the organic solvent include cyclic carbonates such as propylene carbonate (PC), ethylene carbonate (EC), and vinylene carbonate, chain carbonates such as diethyl carbonate (DEC), dimethyl carbonate (DMC), and methylethyl carbonate (MEC), cyclic ethers such as tetrahydrofuran (THF), 2-methyltetrahydrofuran (2MeTHF) or dioxolan (DOX), chain ethers such as dimethoxyethane (DME) and diethoethane (DEE), γ-butyrolactone (GBL), acetonitrile (AN), and sulfolan (SL). These organic solvents may be used either singly or in combinations of two or more.

More preferable examples of the organic solvent include a mixed solvent obtained by mixing two or more kinds selected from the group consisting of propylene carbonate (PC), ethylene carbonate (EC), diethyl carbonate (DEC), dimethyl carbonate (DMC), and methylethyl carbonate (MEC) and a mixed solvent containing γ-butyrolactone (GBL). By virtue of the use of such a mixed solvent, a nonaqueous electrolyte battery excellent in low-temperature performance can be obtained.

Examples of the polymer material include polyvinylidene-fluoride (PVdF), polyacrylonitrile (PAN), and polyethylene oxide (PEO).

(Separator)

As the separator, a porous film formed of a material such as polyethylene, polypropylene, cellulose, or polyvinylidene fluoride (PVdF), synthetic resin nonwoven fabric, or the like may be used. Among these materials, a porous film formed of polyethylene or polypropylene melts at a fixed temperature, making it possible to shut off current and is therefore preferable in terms of improvement in safety.

(Container Member)

As the container member, a bag-like container made of a laminate film or a metal container is used.

Examples of the shape of the container include a flat type, an angular type, a cylinder type, a coin type, a button type, a sheet type, and a laminate type. Of course, examples of the container member include containers for miniature batteries to be mounted in, for example, mobile electronic devices or containers for large batteries to be mounted on, for example, two-wheel or four-wheel vehicles.

As the laminate film, a multilayer film prepared by interposing a metal layer between resin films is used, for example. Preferably, the metal layer is formed of an aluminum foil or aluminum alloy foil to reduce the weight of the battery. As the resin film, polymer materials such as polypropylene (PP), polyethylene (PE), nylon, and polyethylene terephthalate (PET) may be used. The laminate film may be formed a shape of the container member by heat-sealing. It is preferable that the laminate film has a thickness of 0.2 mm or less.

The metal container may be formed of aluminum or an aluminum alloy. The aluminum alloy preferably contains elements such as magnesium, zinc, and silicon. Meanwhile, the contents of transition metals such as iron, copper, nickel, and chromium are preferably 100 ppm or less. Thus, long-term reliability under a high-temperature environment and a thermal radiation property can be improved dramatically. The wall thickness of the metal container is preferably 0.5 mm or less and more preferably 0.2 mm or less.

(Positive Electrode Terminal)

The positive electrode terminal is electrically stable in a potential range of 3.0 V to 4.5 V with respect to lithium ion metal and is preferably formed of a material having electroconductivity. The positive electrode terminal is preferably formed of Al or aluminum alloy containing elements such as Mg, Ti, Zn, Mn, Fe, Cu, and Si. The positive electrode terminal is preferably formed of a material similar to that of the positive electrode current collector to reduce the contact resistance with the positive electrode current collector.

(Negative Electrode Terminal)

The negative electrode terminal is electrically stable in a potential range of 1.0 V to 3.0 V with respect to lithium ion metal and is preferably formed of a material having electroconductivity. The negative electrode terminal is preferably formed of Al or aluminum alloy containing elements such as Mg, Ti, Zn, Mn, Fe, Cu, and Si. The negative electrode terminal is preferably formed of a material similar to that of the negative electrode current collector to reduce the contact resistance with the negative electrode current collector.

Next, an example of the nonaqueous electrolyte battery according to the first embodiment will be described with reference to the drawings.

First, a flat-type nonaqueous electrolyte battery which is an example of the nonaqueous electrolyte battery according to the first embodiment will be described with reference to FIGS. 1 and 2.

FIG. 1 is a cross-sectional schematic diagram of a flat-type nonaqueous electrolyte secondary battery of an example according to the first embodiment. FIG. 2 is an enlarged cross-sectional view of an A portion of FIG. 1.

A nonaqueous electrolyte battery 10 shown in FIGS. 1 and 2 comprises a flat-type coil electrode group 1.

The flat-type coil electrode group 1 is provided with a negative electrode 3, a separator 4, and a positive electrode 5, as shown in FIG. 2. In the negative electrode 3, the separator 4, and the positive electrode 5, the separator 4 is interposed between the negative electrode 3 and the positive electrode 5. This flat-type coil electrode group 1 can be formed by spirally coiling a laminate, which is formed by stacking the negative electrode 3, the separator 4, and the positive electrode 5 so that the separator 4 is interposed between the negative electrode 3 and the positive electrode 5, so that the negative electrode 3 is positioned outside, as shown in FIG. 2, and by press-molding the coiled laminate.

The negative electrode 3 includes a negative electrode current collector 3a and a negative electrode layer 3b. The outermost negative electrode 3 has a configuration in which as shown in FIG. 2, the negative electrode layer 3b is formed on only one of the inner surfaces of the negative electrode current collector 3a. In other negative electrodes 3, the negative electrode layer 3b is formed on each surface of the negative electrode current collector 3a.

In the positive electrode 5, a positive electrode layer 5b is formed on each surface of a positive electrode current collector 5a.

As shown in FIG. 1, in the vicinity of the outer peripheral end of the coil electrode group 1, a negative electrode terminal 6 is connected to the negative electrode current collector 3a of the outermost negative electrode 3, and a positive electrode terminal 7 is connected to the positive electrode current collector 5a of the inside positive electrode 5.

The coil electrode group 1 is accommodated in a bag-like container 2 made of a laminate film in which a metal layer is interposed between two resin layers.

The negative electrode terminal 6 and the positive electrode terminal 7 extend outside from an opening of the bag-like container 2. For example, a liquid nonaqueous electrolyte is injected through the opening of the bag-like container 2 and stored in the bag-like container 2.

In the bag-like container 2, the coil electrode group 1 and the liquid nonaqueous electrolyte are perfectly sealed by heat sealing the opening while holding the negative electrode terminal 6 and the positive electrode terminal 7.

Next, a flat-type nonaqueous electrolyte battery which is another example of the nonaqueous electrolyte battery according to the first embodiment will be described with reference to FIGS. 3 and 4.

FIG. 3 is a partially notched perspective view schematically showing the flat-type nonaqueous electrolyte battery of another example according to the first embodiment. FIG. 4 is a cross-sectional schematic diagram of a B portion of FIG. 3.

Figure 4:
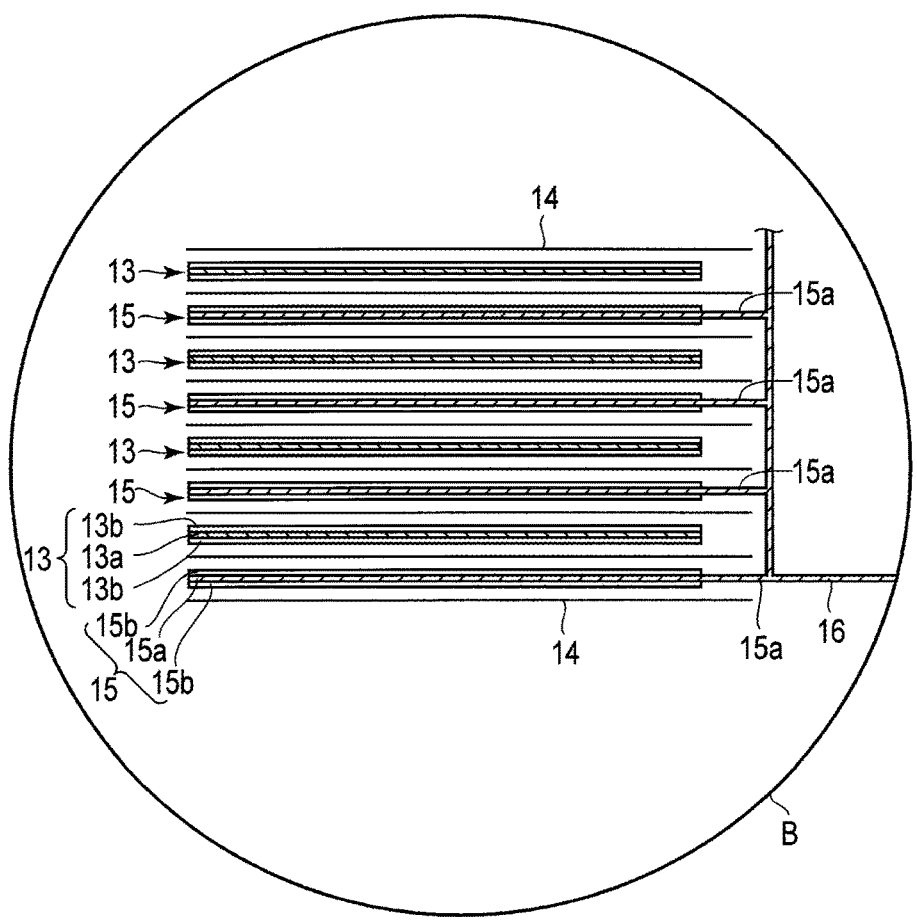
FIG. 4 is an enlarged cross-sectional view of a B portion of FIG. 3.

A battery 10' shown in FIGS. 3 and 4 comprises a laminate type electrode group 11.

The laminate type electrode group 11 is stored in a container 12 made of a laminate film in which a metal layer is interposed between two resin films. The laminate type electrode group 11 has a structure in which a positive electrode 13 and a negative electrode 15 are, as shown in FIG. 4, alternately stacked with a separator 14 interposed therebetween. A plural of the positive electrodes 13 exist and are each provided with a positive electrode current collector 13a and a positive electrode layer 13b carried on each side of the positive electrode current collector 13a. A plural of the negative electrodes 15 exist and are each provided with a negative electrode current collector 15a and a negative electrode layer 15b carried on each side of the negative electrode current collector 15a. In the negative electrode current collector 15a of each of the negative electrodes 15, one side protrudes from the negative electrodes 15. The protruding negative electrode current collector 15a is electrically connected to a band-shaped negative electrode terminal 16. A distal end of the band-shaped negative electrode terminal 16 is externally drawn out of the container 12. Although not illustrated, in the positive electrode current collector 13a of the positive electrode 13, the side positioned opposite to the protruding side of the negative electrode current collector 15a protrudes from the positive electrode 13. The positive electrode current collector 13a protruding from the positive electrode 13 is electrically connected to a band-shaped positive electrode terminal 17. A distal end of the band-shaped positive electrode terminal 17 is positioned opposite to the negative electrode terminal 16 and drawn out of the side of the container 12.

According to the first embodiment, a nonaqueous electrolyte battery is provided. Since the nonaqueous electrolyte battery contains a positive electrode active material represented by $LiMn_{1-x-y}Fe_xA_yPO_4$ and the material that Li or Li ion can be inserted to at a potential of 3.3 V (vs. Li/Li$^+$) or less, high energy density is exhibited, and, at the same time, a rapid reduction in the potential of the positive electrode at the end of discharge can be prevented, so that excellent cycle life characteristics can be in turn exhibited.

Second Embodiment

According to a second embodiment, a battery pack is provided. The battery pack includes the nonaqueous electrolyte battery according to the first embodiment.

The battery pack according to the second embodiment may be provided with one nonaqueous electrolyte battery or a plural of nonaqueous electrolyte batteries. When the battery pack according to the second embodiment is provided with a plural of nonaqueous electrolyte batteries, unit batteries can be arranged in such a manner that they are electrically connected in series or in parallel or can be arranged by combining series connection and parallel connection.

Next, an example of the battery pack according to the second embodiment will be described with reference to the drawings.

Figure 5:
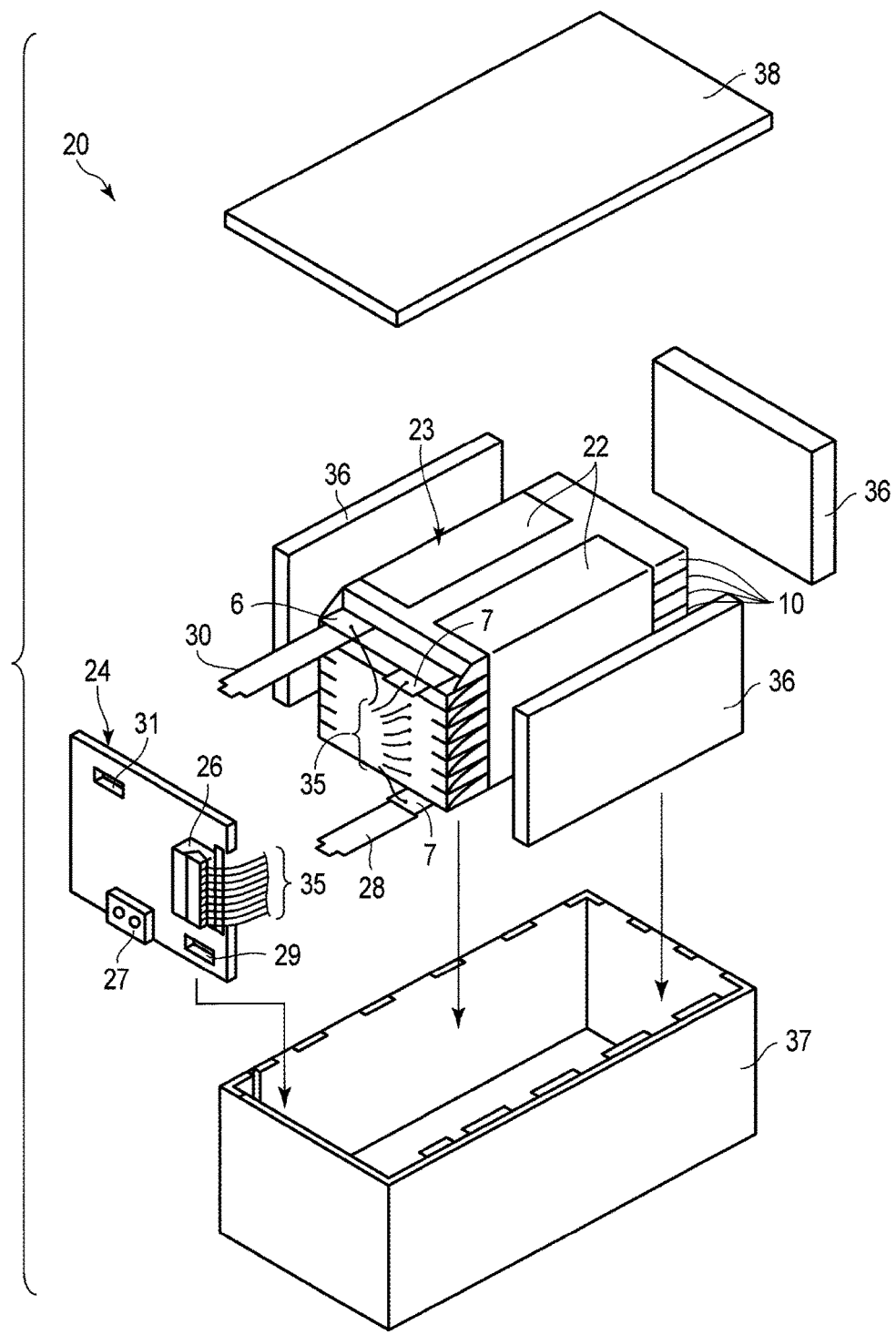
FIG. 5 is an exploded perspective view of a battery pack of an example according to a second embodiment.

FIG. 5 is an exploded perspective view of a battery pack of an example according to the second embodiment. FIG. 6 is a block diagram showing an electrical circuit of the battery pack shown in FIG. 5.

The battery pack 20 shown in FIGS. 5 and 6 includes a plural of flat-type batteries 10 having the structure shown in FIGS. 1 and 2.

A plural of unit batteries 10 are stacked so that a negative electrode terminal 6 and a positive electrode terminal 7 extending outside are arranged in the same direction and fastened with an adhesive tape 22 to thereby constitute a battery module 23. These unit batteries 10 are electrically connected in series as shown in FIG. 6.

A printed wiring board 24 is disposed opposite to the side surface of each of the unit batteries 10 from which the negative electrode terminal 6 and the positive electrode terminal 7 extend. As shown in FIG. 6, a thermistor 25, a protective circuit 26, and an energizing terminal 27 connected to external devices are mounted on the printed wiring board 24. An insulating plate (not shown) is attached to the surface of the printed wiring board 24 facing the battery module 23 to avoid unnecessary connection with the wiring of the battery module 23.

A positive electrode side lead 28 is connected to the positive electrode terminal 7 of the unit battery 10 positioned on the lowermost layer of the battery module 23, and the distal end of the positive electrode side lead 28 is inserted into and electrically connected to a positive electrode side connector 29 of the printed wiring board 24. A negative electrode side lead 30 is connected to the negative electrode terminal 6 of the unit battery 10 positioned on the uppermost layer of the battery module 23, and the distal end of the negative electrode side lead 30 is inserted into and electrically connected to a negative electrode side connector 31 of the printed wiring board 24. These connectors 29 and 31 are connected to the protective circuit 26 respectively through wirings 32 and 33 formed on the printed wiring board 24.

The thermistor 25 detects the temperature of each of the unit batteries 10 and transmits the detected signals to the protective circuit 26. The protective circuit 26 can shut off a plus side wiring 34a and a minus side wiring 34b between the protective circuit 26 and the energizing terminal 27 connected to external devices in a predetermined condition. Examples of the predetermined condition include the case where a signal showing that the temperature of the unit battery 10 is not less than a predetermined temperature is received from the thermistor 25. Another example of the predetermined condition includes the case of detecting overcharge, overdischarge, over-current, and the like of the unit battery 10. The detections of the overcharge and the like are made for the individual unit batteries 10 or for the entire unit batteries 10. When the individual unit batteries 10 are detected, a battery voltage may be detected, or a positive electrode potential or a negative electrode potential may be detected. In the latter case, a lithium electrode used as a reference electrode is inserted into each of the unit batteries 10. In the battery pack shown in FIG. 5 and FIG. 6, a wiring 35 for detecting voltage is connected to each of the unit batteries 10, and the detection signals are transmitted to the protective circuit 26 through these wirings 35.

A protective sheet 36 formed of rubber or resin is disposed on each of the three side surfaces of the battery module 23 except for the side surface from which the positive electrode terminal 7 and the negative electrode terminal 6 protrude.

The battery module 23 is stored in a storage container 37 together with each of the protective sheets 36 and the printed wiring board 24. Namely, the protective sheet 36 is disposed on each inside surface in the direction of the long side and on one of the inside surfaces in the direction of the short side of the storage container 37, and the printed wiring board 24 is disposed on the other inside surface in the direction of the short side. The battery module 23 is positioned in a space enclosed by the protective sheet 36 and the printed wiring board 24. A lid 38 is attached to the upper surface of the storage container 37.

Here, a thermal shrinkage tape may be used in place of the adhesive tape 22 to secure the battery module 23. In this case, the protective sheet is disposed on both sides of the battery module, and thermal shrinkage tape is wound around the battery module; thereafter, the thermal shrinkage tape is shrunk by heating to fasten the battery module.

Although the battery pack 20 shown in FIGS. 5 and 6 has such a form that a plural of the unit batteries 10 are connected in series, in the battery pack according to the second embodiment, a plural of unit batteries 10 may be connected in parallel to increase the capacity of the battery. Alternatively, the battery pack according to the second embodiment may be provided with a plural of unit batteries 10 connected by combining series connection and parallel connection. The assembled battery packs 20 may be further connected in series or in parallel.

Although the battery pack 20 shown in FIGS. 5 and 6 is provided with a plural of the unit batteries 10, the battery pack according to the second embodiment may be provided with a single unit battery 10.

The embodiment of the battery pack is appropriately modified according to its intended use. The battery pack according to the present embodiment is preferably used in applications requiring an excellent cycle performance when a large current is extracted. Specific examples of such applications include power sources for digital cameras, and power sources mounted on vehicles such as two-wheel or four-wheel hybrid electric vehicles, two-wheel or four-wheel electric vehicles, and assist bicycles. In particular, the battery pack is preferably used for power sources mounted on vehicles.

Since the battery pack according to the second embodiment includes the nonaqueous electrolyte battery according to the first embodiment, excellent charge/discharge characteristics can be exhibited while exhibiting high energy density.

EXAMPLES

Hereinafter, examples will be described, and the present invention is not limited to the examples described below insofar as the examples do not deviate from the spirit of the invention.

Example 1

In Example 1, an evaluation cell was produced by the following procedure.

<Production of Positive Electrode>

As a positive electrode active material, iron-containing lithium manganese phosphate $LiMn_{0.8}Fe_{0.2}PO_4$ was provided. Further, manganese dioxide $MnO_2$ was provided. Manganese dioxide $MnO_2$ is a material that Li or Li ion can be inserted to at a potential of approximately 3.0 V (vs. $Li/Li^+$). The provided lithium manganese phosphate and manganese dioxide were mixed at a weight ratio of 10:1 to obtain a mixture. The mixture of 90 wt %, acetylene black of 5 wt %, and polyvinylidene-fluoride (PVdF) of 5 wt % were added to N-methylpyrrolidone (NMP) to be mixed, and, thus, to prepare a positive electrode slurry. After the prepared positive electrode slurry was coated onto both surfaces of an aluminum foil current collector having a thickness of 15 μm, the coated slurry was dried and then pressed to produce a positive electrode including a positive electrode current collector and a positive electrode layer formed on both surfaces of the positive electrode current collector.

<Production of Negative Electrode>

As a negative electrode active material, spinel type lithium titanate $Li_4Ti_5O_{12}$ of 92 wt % as a negative electrode active material, acetylene black of 3 wt %, coke of 3 wt %, and PVdF of 2 wt % were dissolved in NMP to obtain a negative electrode slurry. After the prepared negative electrode slurry was coated onto both surfaces of an aluminum foil current collector having a thickness of 15 μm, the coated slurry was dried and then pressed to produce a negative electrode including a negative electrode current collector and a negative electrode layer formed on both surfaces of the negative electrode current collector.

<Preparation of Nonaqueous Electrolyte>

A nonaqueous solvent was prepared by mixing ethylene carbonate (EC) with diethyl carbonate (DEC) in a ratio by volume of 1:2. $LiPf_6$ as an electrolyte was dissolved in the nonaqueous solvent at a concentration of 1.0 mol/L. Thus, a nonaqueous electrolyte was prepared.

<Production of Evaluation Cell>

In dry argon, the positive electrode and the negative electrode previously produced were made to face each other through a glass filter as a separator, these members were put in a bipolar glass cell, and the positive electrode and the negative electrode were connected respectively to a positive electrode terminal and a negative electrode terminal of the glass cell. Then, the nonaqueous electrolytic thus prepared was poured into the glass cell to allow the positive electrode, the negative electrode, and the separator to be sufficiently impregnated with the nonaqueous electrolytic. In this state, a glass container was closed tightly to produce the evaluation cell of Example 1.

Example 2

The evaluation cell of Example 2 was produced similarly to Example 1, except that iron-containing lithium manganese phosphate and manganese dioxide were mixed at a weight ratio of 20:1 to obtain a mixture.

Example 3

The evaluation cell of Example 3 was produced similarly to Example 1, except that iron-containing lithium manganese phosphate and manganese dioxide were mixed at a weight ratio of 40:1 to obtain a mixture.

Example 4

The evaluation cell of Example 4 was produced similarly to Example 1, except that iron-containing lithium manganese phosphate and manganese dioxide were mixed at a weight ratio of 100:1 to obtain a mixture.

Example 5

The evaluation cell of Example 5 was produced similarly to Example 1, except that vanadium oxide $V_2O_5$ was used instead of manganese dioxide.

Vanadium oxide is a material that Li or Li ion can be inserted to at a potential of approximately 3.0 V (vs. $Li/Li^+$).

Example 6

The evaluation cell of Example 6 was produced similarly to Example 1, except that molybdenum oxide $MoO_3$ was used instead of manganese dioxide.

Molybdenum oxide is a material that Li or Li ion can be inserted to at a potential of approximately 2.5 V (vs. $Li/Li^+$).

Example 7

The evaluation cell of Example 7 was produced similarly to Example 1, except that iron fluoride $FeF_3$ was used instead of manganese dioxide.

Iron fluoride is a material that Li or Li ion can be inserted to at a potential of approximately 3.0 V (vs. $Li/Li^+$).

Example 8

The evaluation cell of Example 8 was produced similarly to Example 1, except that titanium sulfide $TiS_2$ was used instead of manganese dioxide.

Titanium sulfide is a material that Li or Li ion can be inserted to at a potential of approximately 2.4 V (vs. $Li/Li^+$).

Example 9

The evaluation cell of Example 9 was produced similarly to Example 1, except that lithium manganese phosphate $LiMn_{0.8}Fe_{0.1}Mg_{0.1}PO_4$ containing iron and magnesium was used as the positive electrode active material, instead of iron-containing lithium manganese phosphate $LiMn_{0.8}Fe_{0.2}PO_4$.

Example 10

The evaluation cell of Example 10 was produced similarly to Example 1, except that lithium manganese phosphate $LiMn_{0.9}Fe_{0.05}Mg_{0.05}PO_4$ containing iron and magnesium was used as the positive electrode active material, instead of iron-containing lithium manganese phosphate $LiMn_{0.8}Fe_{0.2}PO_4$.

Example 11

The evaluation cell of Example 11 was produced similarly to Example 1, except that lithium manganese phosphate $LiMn_{0.7}Fe_{0.2}Mg_{0.1}PO_4$ containing iron and magnesium was used as the positive electrode active material, instead of iron-containing lithium manganese phosphate $LiMn_{0.8}Fe_{0.2}PO_4$.

Example 12

The evaluation cell of Example 12 was produced similarly to Example 1, except that lithium manganese phosphate $LiMn_{0.85}Fe_{0.1}Ca_{0.05}PO_4$ containing iron and calcium was used as the positive electrode active material, instead of iron-containing lithium manganese phosphate $LiMn_{0.8}Fe_{0.2}PO_4$.

Example 13

The evaluation cell of Example 13 was produced similarly to Example 1, except that lithium manganese phosphate $LiMn_{0.85}Fe_{0.1}Al_{0.05}PO_4$ containing iron and aluminum was used as the positive electrode active material, instead of iron-containing lithium manganese phosphate $LiMn_{0.8}Fe_{0.2}PO_4$.

Example 14

The evaluation cell of Example 14 was produced similarly to Example 1, except that lithium manganese phosphate $LiMn_{0.85}Fe_{0.1}Ti_{0.05}PO_4$ containing iron and titanium was used as the positive electrode active material, instead of iron-containing lithium manganese phosphate $LiMn_{0.8}Fe_{0.2}PO_4$.

Example 15

The evaluation cell of Example 15 was produced similarly to Example 1, except that lithium manganese phosphate $LiMn_{0.85}Fe_{0.1}Zn_{0.05}PO_4$ containing iron and zinc was used as the positive electrode active material, instead of iron-containing lithium manganese phosphate $LiMn_{0.8}Fe_{0.2}PO_4$.

Example 16

The evaluation cell of Example 16 was produced similarly to Example 1, except that lithium manganese phosphate $LiMn_{0.85}Fe_{0.1}Zr_{0.05}PO_4$ containing iron and zirconium was used as the positive electrode active material, instead of iron-containing lithium manganese phosphate $LiMn_{0.8}Fe_{0.2}PO_4$.

Example 17

The evaluation cell of Example 17 was produced similarly to Example 1, except that a monoclinic β-type titanium composite oxide $TiO_2$ (B) was used instead of spinel type lithium titanate.

Example 18

The evaluation cell of Example 18 was produced similarly to Example 1, except that iron-containing lithium manganese phosphate and manganese dioxide were mixed at a weight ratio of 5:1 to obtain a mixture.

Example 19

The evaluation cell of Example 19 was produced similarly to Example 1, except that iron-containing lithium manganese phosphate and manganese dioxide were mixed at a weight ratio of 120:1 to obtain a mixture.

Comparative Example 1

The evaluation cell of Comparative Example 1 was produced similarly to Example 1, except that manganese dioxide was not used in preparation of a positive electrode slurry.

Comparative Example 2

The evaluation cell of Comparative Example 2 was produced similarly to Comparative Example 1, except that a monoclinic β-type titanium composite oxide was used instead of spinel type lithium titanate.

[Evaluation]

<Charge/Discharge Test of Glass Cell>

A charge/discharge cycle test was conducted on each of the evaluation cells of Examples 1 to 19 and Comparative Examples 1 to 2 in an environment of 25° C. The charge/discharge rate was 0.1 C, and the potential range was 1.0 to 2.7 V. The following Table 1 shows a capacity maintenance rate after 100 cycles in each of the evaluation cells of Examples 1 to 19 and Comparative Examples 1 to 2.

TABLE 1

| | Positive electrode active material (A) | Additive (B) | Mixing weight ratio (A:B) | Capacity maintenance rate (%) |
|---|---|---|---|---|
| Example 1 | $LiMn_{0.8}Fe_{0.2}PO_4$ | $MnO_2$ | 10:1 | 93 |
| Example 2 | $LiMn_{0.8}Fe_{0.2}PO_4$ | $MnO_2$ | 20:1 | 90 |
| Example 3 | $LiMn_{0.8}Fe_{0.2}PO_4$ | $MnO_2$ | 40:1 | 88 |
| Example 4 | $LiMn_{0.8}Fe_{0.2}PO_4$ | $MnO_2$ | 100:1 | 82 |
| Example 5 | $LiMn_{0.8}Fe_{0.2}PO_4$ | $V_2O_5$ | 10:1 | 88 |
| Example 6 | $LiMn_{0.8}Fe_{0.2}PO_4$ | $MoO_3$ | 10:1 | 89 |
| Example 7 | $LiMn_{0.8}Fe_{0.2}PO_4$ | $FeF_3$ | 10:1 | 85 |
| Example 8 | $LiMn_{0.8}Fe_{0.2}PO_4$ | $TiS_2$ | 10:1 | 82 |
| Example 9 | $LiMn_{0.8}Fe_{0.1}Mg_{0.1}PO_4$ | $MnO_2$ | 10:1 | 95 |
| Example 10 | $LiMn_{0.9}Fe_{0.05}Mg_{0.08}PO_4$ | $MnO_2$ | 10:1 | 91 |
| Example 11 | $LiMn_{0.7}Fe_{0.2}Mg_{0.1}PO_4$ | $MnO_2$ | 10:1 | 96 |
| Example 12 | $LiMn_{0.85}Fe_{0.1}Ca_{0.05}PO_4$ | $MnO_2$ | 10:1 | 90 |
| Example 13 | $LiMn_{0.85}Fe_{0.1}Al_{0.05}PO_4$ | $MnO_2$ | 10:1 | 89 |
| Example 14 | $LiMn_{0.85}Fe_{0.1}Ti_{0.05}PO_4$ | $MnO_2$ | 10:1 | 93 |
| Example 15 | $LiMn_{0.85}Fe_{0.1}Zn_{0.05}PO_4$ | $MnO_2$ | 10:1 | 91 |
| Example 16 | $LiMn_{0.85}Fe_{0.1}Zr_{0.05}PO_4$ | $MnO_2$ | 10:1 | 91 |
| Example 17 | $LiMn_{0.8}Fe_{0.2}PO_4$ | $MnO_2$ | 10:1 | 77 |
| Example 18 | $LiMn_{0.8}Fe_{0.2}PO_4$ | $MnO_2$ | 5:1 | 85 |
| Example 19 | $LiMn_{0.8}Fe_{0.2}PO_4$ | $MnO_2$ | 120:1 | 80 |
| Comparative Example 1 | $LiMn_{0.8}Fe_{0.2}PO_4$ | none | — | 78 |
| Comparative Example 2 | $LiMn_{0.8}Fe_{0.2}PO_4$ | none | — | 71 |

From the results shown in Table 1, it is found that in each of the evaluation cells of Examples 1 to 16 in which the negative electrode layer contains spinel type lithium titanate, and the positive electrode layer contains iron-containing lithium manganese phosphate and a material that Li or Li ion can be inserted to at a potential of 3.3 V (vs. Li/Li$^+$) or less, a good capacity maintenance rate was obtained as compared to Comparative Example 1 in which the negative electrode layer contains spinel type lithium titanate, and the positive electrode layer contains iron-containing lithium manganese phosphate but does not contain the material that Li or Li ion can be inserted to at a potential of 3.3 V (vs. Li/Li$^+$) or less. Further, from the results shown in Table 1, it is found that also in Examples 5 to 8 using the material that Li or Li ion can be inserted to at a potential of 3.3 V (vs. Li/Li$^+$) or less other than manganese dioxide, a good capacity maintenance rate was obtained similarly to Example 1. Furthermore, from the results of Table 1, it is found that also in Examples 9 to 16 using, as the positive electrode active material, lithium manganese phosphate different from one in Example 1 in that any of Mg, Ca, Al, Ti, Zn, and Zr is contained, a good capacity maintenance rate was obtained similarly to Example 1.

From the results of Example 17 and Comparative Example 2 shown in Table 1, it is found that even when the negative electrode layer contains monoclinic β-type titanium composite oxide, as in the case where the negative electrode layer contains spinel type lithium titanate, there could be achieved the enhancement of the capacity maintenance rate by virtue of the fact that the positive electrode layer contains iron-containing lithium manganese phosphate and the material that Li or Li ion can be inserted to at a potential of 3.3 V (vs. Li/Li$^+$) or less.

Further, from the results shown in Table 1, it is found that in Examples 1 to 4 in which the weight ratio of the weight of iron-containing lithium manganese phosphate to manganese dioxide is 10 to 100, a good capacity maintenance rate was obtained as compared to Example 19 in which the weight ratio of the weight of iron-containing lithium manganese phosphate to manganese dioxide is 120. Furthermore, from the results shown in Table 1, it is found that in Examples 1 to 3 in which the weight ratio of the weight of iron-containing lithium manganese phosphate to manganese dioxide is 10 to 40, a better capacity maintenance rate was obtained as compared to Example 4 in which the weight ratio of the weight of iron-containing lithium manganese phosphate to manganese dioxide is 100.

Although the capacity maintenance rate of 85% was shown in Example 18, the weight ratio of the weight of iron-containing lithium manganese phosphate to manganese dioxide was 5, and the amount of lithium manganese phosphate contained in the positive electrode layer was small; therefore, the energy density of the positive electrode was extremely low as compared to Examples 1 to 4.

<Evaluation of Discharge Curves of Example 1 and Comparative Example 1>

Figure 7:
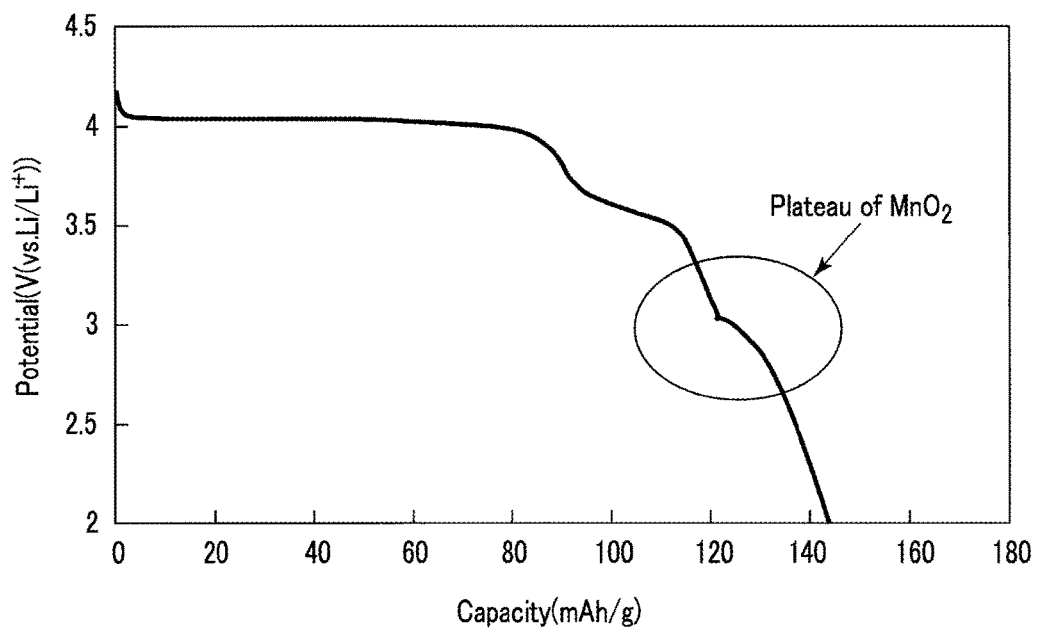
FIG. 7 is a discharge curve for Example 1.
Figure 8:
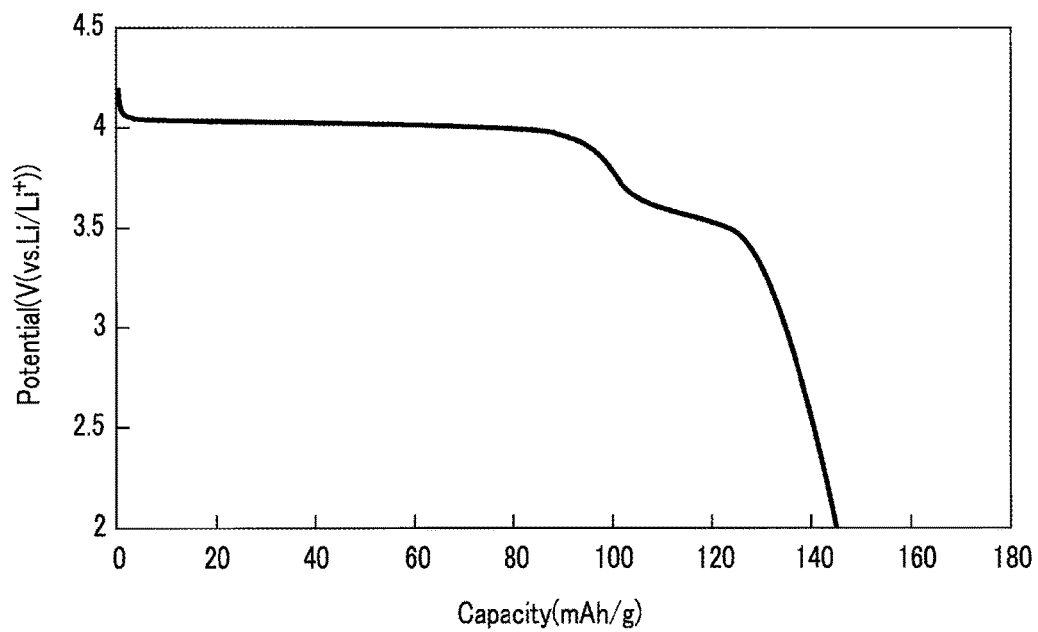
FIG. 8 is a discharge curve for Comparative Example 1.

In the positive electrode of the evaluation cell of Example 1 and the positive electrode of the evaluation cell of Comparative Example 1, the single-electrode evaluation was performed as described above to obtain discharge curves. FIG. 7 shows the discharge curve of the positive electrode of Example 1. FIG. 8 shows the discharge curve of the positive electrode of Comparative Example 1.

In the discharge curve shown in FIG. 7, the discharge curve has a plateau near 3 V (vs. Li/Li$^+$), and an inflection point due to Li insertion to manganese dioxide was confirmed. Meanwhile, in the discharge curve shown in FIG. 8, no plateau was observed at 3.3 V (vs. Li/Li$^+$) or less. From this discharge curve, it is found that in the evaluation cell of Example 1, manganese dioxide contained in the positive electrode layer could absorb Li near 3 V (vs. Li/Li$^+$).

According to at least one embodiment and Examples described above, a nonaqueous electrolyte battery is provided. Since the nonaqueous electrolyte battery contains the positive electrode active material represented by LiMn$_{1-x-y}$Fe$_x$A$_y$PO$_4$ and the material that Li or Li ion can be inserted to at a potential of 3.3 V (vs. Li/Li$^+$) or less, high energy density is exhibited, and, at the same time, a rapid reduction in the potential of the positive electrode at the end of discharge can be prevented, so that excellent cycle life characteristics can be in turn exhibited.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
   a negative electrode containing a negative electrode active material having a Li insertion/extraction potential of 0.8 V (vs. Li/Li$^+$) or more;
   a positive electrode containing a positive electrode active material represented by LiMn$_{1-x-y}$Fe$_x$A$_y$PO$_4$ (wherein 0<x≤0.3, 0≤y≤0.1, and A is at least one selected from the group consisting of Mg, Ca, Al, Ti, Zn, and Zr) and a material that Li can be inserted to at a potential of 3.3 V (vs. Li/Li$^+$) or less; and
   a nonaqueous electrolyte,
   wherein a ratio of a weight of the positive electrode active material to a weight of the material is from 5 to 120.

2. The nonaqueous electrolyte battery according to claim 1, wherein the ratio of the weight of the positive electrode active material to the weight of the material is from 10 to 100.

3. The nonaqueous electrolyte battery according to claim 1, wherein the material is an oxide, fluoride, sulfide, or polymer.

4. The nonaqueous electrolyte battery according to claim 1, wherein the material is a manganese oxide.

5. The nonaqueous electrolyte battery according to claim 1, wherein the material is an iron-containing fluoride.

6. The nonaqueous electrolyte battery according to claim 1, wherein the negative electrode active material contains spinel type lithium titanate.

7. The nonaqueous electrolyte battery according to claim 1, wherein the negative electrode active material contains monoclinic β-type titanium composite oxide.

8. A battery pack comprising the nonaqueous electrolyte battery according to claim 1.

9. The nonaqueous electrolyte battery according to claim 1, wherein the material is at least one selected from the group consisting of a vanadium oxide, a manganese oxide, a molybdenum oxide, a composite oxide, an iron fluoride and a titanium sulfide.

10. The nonaqueous electrolyte battery according to claim 9, wherein the ratio of the weight of the positive electrode active material to the weight of the material is from 10 to 100.

11. The nonaqueous electrolyte battery according to claim 9, wherein the material is at least one selected from the group consisting of V$_6$O$_{13}$, V$_2$O$_5$, MnO$_2$, MoO$_3$, Cu$_2$V$_2$O$_7$, Fe$_2$(MoO$_4$)$_3$, Fe$_2$(WO$_4$)$_3$, FeF$_3$ and TiS$_2$.

12. The nonaqueous electrolyte battery according to claim 10, wherein the material is at least one selected from the group consisting of V$_6$O$_{13}$, V$_2$O$_5$, MnO$_2$, MoO$_3$, Cu$_2$V$_2$O$_7$, Fe$_2$(MoO$_4$)$_3$, Fe$_2$(WO$_4$)$_3$, FeF$_3$ and TiS$_2$.

13. A battery pack comprising the nonaqueous electrolyte battery according to claim 9.

14. A battery pack comprising the nonaqueous electrolyte battery according to claim 10.

15. A battery pack comprising the nonaqueous electrolyte battery according to claim 11.

16. The battery pack according to claim 8, further comprising:
   an external power distribution terminal; and
   a protective circuit.

17. The battery pack according to claim 8, comprising plural of the secondary battery, wherein the secondary batteries are electrically connected in series, in parallel, or in a combination of in series and in parallel.

18. A vehicle comprising the battery pack according to claim 8.

19. The battery pack according to claim 13, further comprising:
   an external power distribution terminal; and
   a protective circuit.

20. The battery pack according to claim 14, further comprising:
   an external power distribution terminal; and
   a protective circuit.

* * * * *